United States Patent [19]

Hansen et al.

[11] 4,126,199

[45] Nov. 21, 1978

[54] BOTTOM SERVICED AIR CLEANER FOR A MOTOR VEHICLE

[75] Inventors: Kenneth N. Hansen, Waukesha; Armand J. Ruka, Brookfield, both of Wis.

[73] Assignee: Allis-Chalmers Corporation, Milwaukee, Wis.

[21] Appl. No.: 795,411

[22] Filed: May 9, 1977

[51] Int. Cl.² ............................................. B60K 13/02
[52] U.S. Cl. ................................................. 180/54 A
[58] Field of Search ............... 180/68 R, 68 P, 69 R, 180/69 C, 54 A, 54 D

[56] References Cited

U.S. PATENT DOCUMENTS

| 1,774,352 | 8/1930 | Bull | 180/54 A |
| 2,173,338 | 9/1939 | Morris | 180/68 P |
| 2,705,540 | 4/1955 | Zierer | 180/54 A |
| 2,708,920 | 5/1955 | Pasturczak | 180/54 A |
| 3,307,336 | 3/1967 | Dewsberry | 180/54 A X |
| 3,743,045 | 7/1973 | Hansen | 180/69 R |

Primary Examiner—Joseph F. Peters, Jr.
Assistant Examiner—Milton L. Smith
Attorney, Agent, or Firm—Arthur L. Nelson

[57] ABSTRACT

A bottom serviced air cleaner mounted in a compartment between the grill and radiator of a vehicle with the end of the air cleaner canister extending through the floor of the compartment and having a removable cover for servicing of the air cleaner and thereby eliminating the need for a door to the compartment for replacing the air cleaner filter.

11 Claims, 4 Drawing Figures

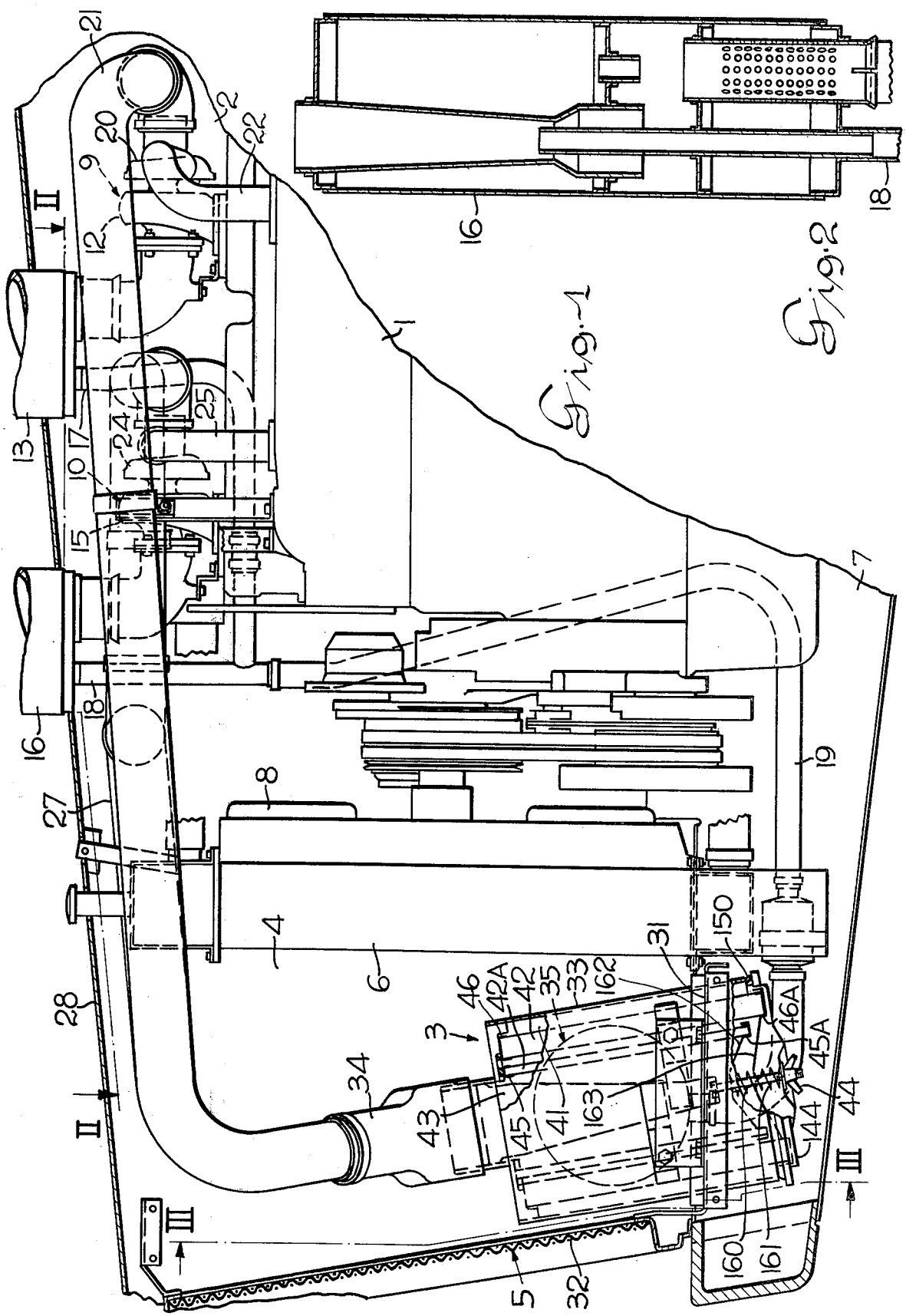

BOTTOM SERVICED AIR CLEANER FOR A MOTOR VEHICLE

This invention relates to an air cleaner and more particularly to an air cleaner mounted in a compartment intermediate the radiator and grill of a motor vehicle with means for servicing the air cleaner from the underside of the compartment through a removable cover on the lower end of the canister of the air cleaner extending through the floor of the compartment.

An internal combustion engine used on a motor vehicle must be supplied with adequate clean air to assure reliability of the engine. Foreign material in the air drawn through the intake manifold to the combustion chamber often is of an abrasive nature which causes undue wear on the pistons, rings and cylinder walls as well as contaminating the oil used in lubrication of the engine. This is particularly true of farming and industrial tractors which are working in an environment in which the air may be laden with dust, chaff, and insects which may be damaging to the engine.

Locating the air cleaner above or to the side of the tractor may block vision and generally inconvenience the operator of the vehicle. It is advantageous to supply cool air to the internal combustion engine to increase volumetric efficiency and accordingly the air cleaner should not be located in the immediate surroundings of the engine which radiates considerable heat and raises the temperature of the air cleaner. By providing cool air through the air cleaner and intake manifold to the combustion chamber, a greater amount of air can be supplied to the engine thereby increasing the volumetric efficiency.

Most vehicles are provided with a grill in spaced relation in front of the vehicle radiator of the cooling system. The compartment intermediate the grill and radiator is supplied with an adequate supply of relatively clean and cool air for use in the air cleaner of the internal combustion engine. Positioning of the air cleaner in a compartment immediately in front of the radiator normally requires a service door to the compartment for servicing of the air cleaner in the compartment. Accordingly, this invention provides for an air cleaner which is mounted in the compartment immediately in front of the radiator and behind the grill. The compartment is generally closed except for a screen on the grill which allows incoming air to flow through the air cleaner compartment from the grill to the radiator. A fan driven by the engine draws the air through the screen by the air cleaner and through the radiator and thereby cools the engine. A floor plate in the compartment supports the lower end of the air cleaner which extends through the floor plate and has a removable cover for servicing of the air cleaner. This obviates the need for any service door for the air cleaner compartment because the servicing for the air cleaner can be done from the underside of the vehicle. A removable cover on the lower end of the canister for the air cleaner permits withdrawing the used filter and allows dirt, dust and impurities to fall out of the canister or may be easily wiped clean by the operator in servicing of the air cleaner. The filter can be conveniently replaced by inserting a new filter in the canister and then replacing the cover which automatically seals the new filter in the canister and the air cleaner is again ready for operation.

By providing a convenient means of servicing the air cleaner, regular servicing to provide the best operating conditions for the engine is assured. This in turn improves reliability of operation of the engine and the tractor in general, and greater efficiency of the engine by assuring adequate quantities of cool fresh air supplied to the engine.

Accordingly, it is an object of this invention to provide an externally serviced air cleaner in a compartment between the grill and the radiator of a motor vehicle wherein the grill provides a screen for removing impurities from the incoming air.

It is another object of this invention to provide a generally enclosed air cleaner compartment between the grill and the radiator of a motor vehicle with a screen on the grill and a strainer on the air cleaner to provide partially cleaned, cool air to the air cleaner.

It is a further object of this invention to provide an air cleaner compartment intermediate the grill and radiator of a motor vehicle with a floor in the compartment partially supporting the lower end of a canister of an air cleaner and a removable cover for servicing of the air cleaner external of the compartment.

It is a further object of this invention to provide an air cleaner mounted in an air cleaner compartment between the grill and radiator of a motor vehicle with a portion of the air cleaner extending through the floor of the compartment for servicing of the air cleaner by means of a removable cover on the end of the air cleaner. The air cleaner extends downwardly whereby the removing of the filter allows dirt in the air cleaner and on the filter to fall downwardly and out of the air cleaner for quick convenient servicing of the air cleaner.

The objects of this invention are accomplished by mounting an air cleaner in a compartment between the grill and the radiator of a motor vehicle. The grill of the motor vehicle includes a screen for removing coarse impurities in the incoming air to the air cleaner compartment. The canister of the air cleaner extends downwardly and is partially supported in the floor of the compartment with the servicing end of the air cleaner extending externally of the air cleaner compartment. A removable cover is positioned on the lower end of the air cleaner which is serviceable from the underside of the motor vehicle. When the cover is removed from the air cleaner, the filter immediately drops out of the air cleaner compartment and impurities and foreign material which may be deposited in the filter chamber can be easily removed by the operator in servicing of the air cleaner. A clean filter can then be inserted in the canister and the cover positioned on the end of the canister with a bayonet lock to automatically seal and lock the filter in the canister of the air cleaner to assure a good, clean, cool supply of fresh air to the intake manifold of the internal combustion engine.

The preferred embodiment of this invention is illustrated in the attached drawings.

FIG. 1, illustrates a side-elevation view partially in cross-section of the air intake system of the vehicle.

FIG. 2, illustrates a cross-section view of the air aspirated muffler.

Figure 3:
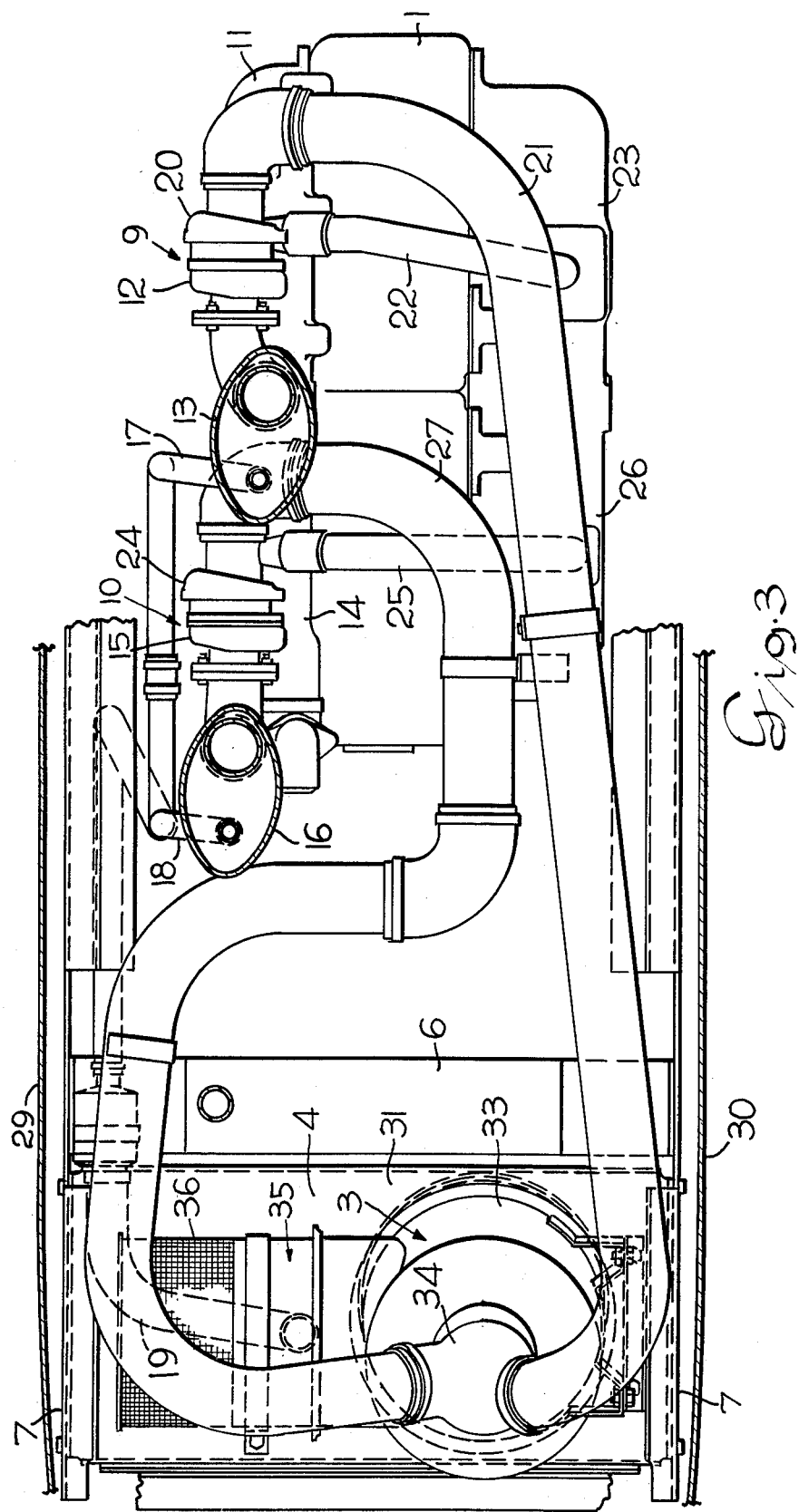
FIG. 3, illustrates a plan view partially in section taken on line II—II of FIG. 1 of the intake air system for the motor vehicle.
Figure 4:
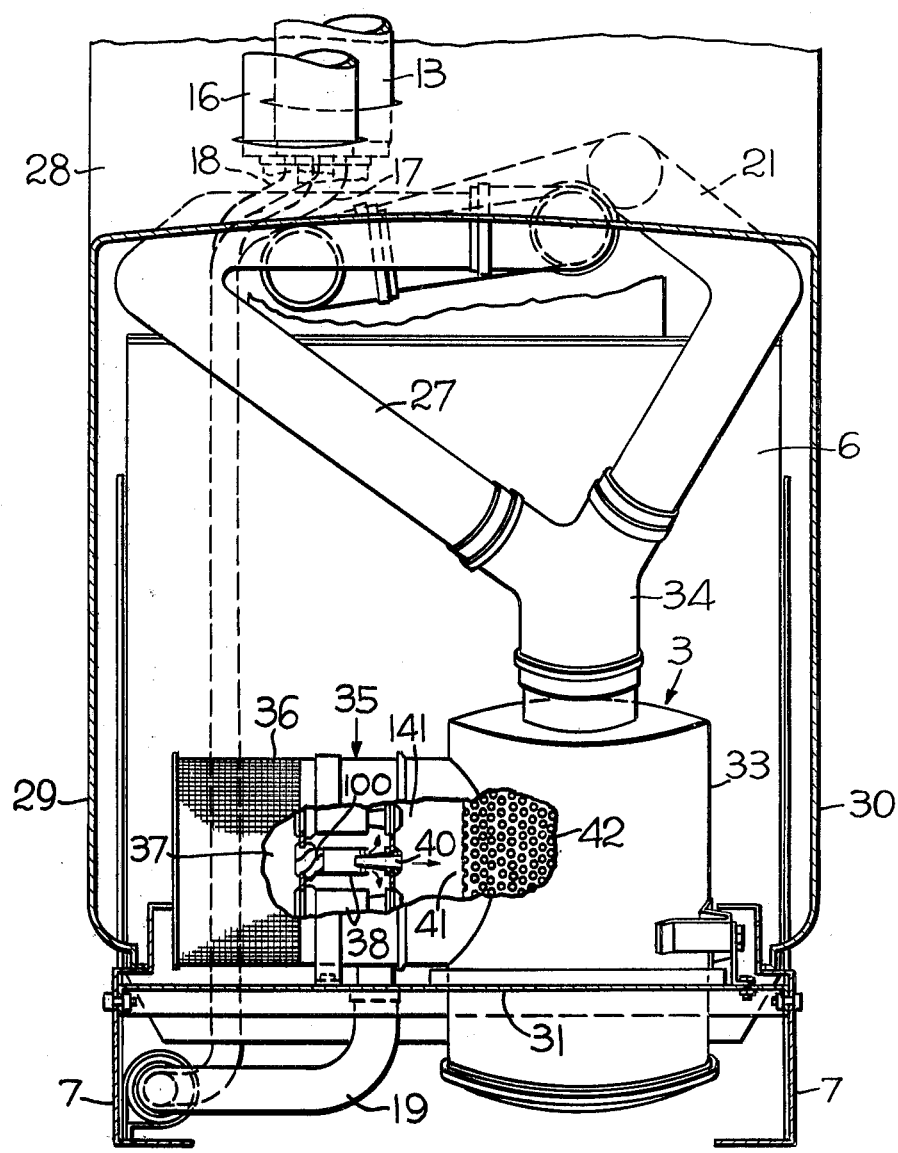
FIG. 4, illustrates a front view partially in section of the motor vehicle taken on line III—III of FIG. 1 showing the intake air system.

Referring to the drawings the preferred embodiment of the invention is illustrated.

FIG. 1 illustrates a side-elevation view partially in section to show the engine 1 mounted in an engine compartment 2 and an air cleaner 3 mounted in an air cleaner compartment 4 between the grill 5 and the radiator 6. The engine 1 is mounted on the vehicle chassis 7 which drives fan 8 which draws air through the radiator 6. The radiator 6 and the grill 5 are also mounted on the vehicle chassis 7.

The engine 1 is a turbocharged engine. The rear turbocharger 9 supplies air to the rear three cylinders of the engine while the front turbocharger 10 supplies air to the intake manifold of the front 3 cylinders. The rear exhaust manifold 11 supplies the exhaust gases to drive the rear turbine 12 and the exhaust gases are discharged into the left rear muffler 13. The front exhaust manifold 14 supplies exhaust gas to the front turbine 15 which discharges the exhaust gases into the front muffler 16. The mufflers 13 and 16 are air aspirated mufflers with scavenger hoses 17 and 18 connected to the air scavenging hose 19 for supplying air from the precleaner 35 of air cleaner 3 to the air aspirated mufflers 13 and 16.

The rear compressor 29 of the rear turbocharger 9 receives fresh air from the air conduit 21 and compresses air in the air intake supply line 22 which is connected to the rear intake manifold 23. The front compressor 24 of the front turbocharger 10 supplies air through the air intake supply line 25 to the front intake manifold 26. The front compressor 24 receives fresh air from the air conduit 27 which is also connected to the air cleaner 3.

The air cleaner compartment 4 is defined by the grill 5 and the radiator 6 and the engine hood 28 with the side panels 29 and 30. The floor panel 31 forms the lower wall of the air cleaner compartment 4. The screen 32 which is an integral part of the grill, screens out large particles of impurities in the air and prevents them from entering the air cleaner compartment 4. The air cleaner 3 includes a canister 33 having a central opening on its upper end which is connected to the outlet conduit 34 which in turn is connected to the air conduits 21 and 27. The fan 8 driven by the engine 1 constantly produces air flow through the grill 5 and the radiator 6 and across the engine for cooling of the engine. This provides a continuous supply of fresh and cool air from the front of the motor vehicle.

The air cleaner canister 33 is connected to a precleaner 35 which includes a strainer 36 which precleans the air from the air cleaner compartment 4. The air in the chamber 37, inside the precleaner screen 36 then passes through a plurality of centrifuges 38. As the air passes through the centrifuge, the air forms a vortex through the rotatable vanes 100 in the centrifuge which spins out a majority of the dirt which in turn is diverted through the scavenging hose 19 and is drawn into the exhaust muffler through scavenging hoses 17 and 18. The dirt from the precleaner 35 is drawn into the aspirating muffler by the movement of the exhaust gases through the muffler and discharged from the muffler. The aspirating muffler ejects the air and dust from the precleaner along with the exhaust gases. Accordingly, dust does not build up in the precleaner and the precleaner need not be serviced. An integral check valve is provided in the scavenging hoses to prevent flow of exhaust gas from the muffler to the air cleaner and permits unidirectional flow only of the air from the precleaner to the aspirating muffler. The air passing through the vent 40 passes through the air inlet chamber 141 and into the filter chamber 41 surrounding the filter 42. The air then filters through the filters 42 and 42A and passes into the central filter air chamber 43 and to the outlet air passage 34 to the turbochargers. Accordingly, the only elements needing service are the filters 42 and 42A.

The filters 42 and 42A can be removed without access to the air cleaner compartment. It is only necessary to rotate the wing nut 44 unlocking the cover assembly 144 from the end of the canister 33. When the cover assembly 144 is removed the filters 42 and 42A automatically drop out of the canister and the internal portion of the canister can quickly be cleaned and new filters placed therein. Springs 160 and 161 hold the filter retainers 162 and 163 in sealing engagement with the filters 42A and 42 respectively. When the cover assembly 44 is pressed against the filters, the filters automatically seal along the seals 45 and 45A and 46 and 46A. When the wing nut is rotated, it locks the cover assembly 144 including a resilient sealing washer 150 on the canister 33 and the air intake system is again ready for operation. Accordingly, servicing of the air intake system for the internal combustion engine is convenient, positive and reliable and assures good operating condition for the engine and improves the volumetric efficiency of the engine by assuring a continuous flow of adequate fresh air to the combustion chambers of the engine.

The operation of this device will be described in the following paragraphs.

The engine 1 is a straight six turbocharged engine. When the engine 1 is in operation, the fan 8 is also rotating and drawing air through the grill 5, the air cleaner compartment 4 and the radiator 6. The air drawn through the air cleaner compartment is relatively clean air since the screen 32 screens out the large impurities in the air as it is drawn through the grill. The air in the air cleaner compartment is available for use for the air intake of the engine 1.

The air cleaner 3 consists of the precleaner 35 and filters for cleaning air for the turbochargers 9 and 10. The air is drawn through the air cleaner 3 and the conduits 21 and 27 to supply the turbochargers 9 and 10. The turbochargers 9 and 10 supply air through the air intake supply lines 22 and 25 to the intake manifolds 23 and 26 which in turn supply air to the combustion chambers of the engine 1.

The air from an air cleaner compartment 4 passes through the strainer 36 on the precleaner 35. As the air passes through this strainer, it then flows through the centrifuges 38 in which the helical vanes impart a rotating movement to the air producing a vortex in the tube in which the major portion of the dirt particles are thrown outwardly and then passed through the scavenging tubes 17, 18 and 19 to the aspirating muffler. The mufflers create a vaccum which draws the air and dust through the scavenging tubes to be exhausted with the exhaust gases in the muffler.

The central portion of the air flow through the centrifuges 38 passes through the air inlet chamber 141 into the filter chamber 41 and the air in turn is filtered by the filters 42 and 42A. As the air is filtered through the filters 42 and 42A and passes into the central filtered air chamber 43, it is then cleaned and passes through the conduits 21 and 27 to the turbochargers. The turbochargers in turn feed the air into the intake manifold and the combustion chambers of the engine.

Basically the only portion of the air intake system which needs servicing is the air cleaner 3. The filters in the air cleaner 3 should be periodically replaced. Since the end of the canister 33 extends through floor panel 31 and servicing cover 144 is external of compartment 4 it is readily removable and the filters can be conveniently removed. Accordingly, when the wing nut is removed the filter drops out of the canister. Any dust which does not drop out of the filter chamber 41 can easily be wiped out and new filters inserted in the chamber and the cover passed against the filters to seal the filters on the respective seats 45, 45A and 46, 46A. The cover 144 is then secured to retain the filters 42 and 42A in the canister of the air cleaner. The air cleaner in the intake air system is then in operating condition.

The embodiments of the invention in which an exclusive property or privilege is claimed are defined as follows:

1. An air cleaner in combination with a motor vehicle, the combination comprising, means defining an air cleaner compartment including a vehicle radiator and a grill in spaced relation to each other, an engine hood and a base plate extending between said radiator and grill, an air cleaner including a canister defining a filter chamber receiving an air filter mounted in said air cleaner compartment, a strainer connected to said cleaner for precleaning air before it enters said air cleaner, a servicing end on said canister extending externally of said compartment and a cover removably mounted thereon for enclosing said filter in said canister and for removal and servicing of said air cleaner externally of said compartment.

2. An air cleaner in combination with a motor vehicle as set forth in claim 1 including an air conduit connected to said air cleaner for conducting air from said air cleaner and adapted for supplying clean air to the intake of an engine.

3. An air cleaner in combination with a motor vehicle as set forth in claim 1 including a filter seat in the filter chamber for seating one end of said filter, and a filter retainer for engaging the other end of said filter when said cover is positioned on said air cleaner.

4. An air cleaner in combination with a motor vehicle as set forth in claim 1 wherein said cover defines a filter retainer for engaging and sealing said filter when said cover is assembled on the air cleaner, and fastening means for removably fastening said cover on said air cleaner.

5. An air cleaner in combination with a motor vehicle as set forth in claim 1 including means on said base plate supporting the servicing end of said air cleaner and permitting the service end of said air cleaner to extend externally of the air cleaner compartment.

6. An air cleaner in combination with a motor vehicle as set forth in claim 1 including a vehicle chassis supporting said components of said air cleaner compartment, means supporting said air cleaner in a recessed position above the lower surface of said chassis for servicing of said air cleaner.

7. An air cleaner in combination with a motor vehicle as set forth in claim 1 wherein said grill includes a screen for screening impurities from the air flow into said air cleaner compartment.

8. An air cleaner in combination with a motor vehicle as set forth in claim 1 including a chassis defining support beams for supporting said components of said air cleaner compartment, means supporting said base plate between said support beams and supporting said air cleaner for servicing beneath said base plate.

9. An air cleaner in combination with a motor vehicle as set forth in claim 1 including a precleaner on said air cleaner, said precleaner including said strainer for straining air entering said air cleaner.

10. An air cleaner in combination with a motor vehicle as set forth in claim 1 wherein said servicing end on said canister extends through said base plate.

11. An air cleaner in combination with a motor vehicle as set forth in claim 1 including, a screen on said grill operating as a coarse filter for filtering air that enters said air cleaner compartment, a precleaner on said air cleaner including said strainer operating as a medium filter for filtering air as it enters said precleaner, said precleaner separating particles of dirt from the air supplied to said filter chamber, scavenging means discharging the separated dirt from said precleaner, said filter element filtering the air from said precleaner thereby providing clean air for transmission to air inlet conduits for the intake of an engine.

* * * * *